(12) United States Patent
Matsen et al.

(10) Patent No.: US 9,457,404 B2
(45) Date of Patent: Oct. 4, 2016

(54) METHOD OF CONSOLIDATING/MOLDING NEAR NET-SHAPED COMPONENTS MADE FROM POWDERS

(71) Applicant: The Boeing Company, Chicago, IL (US)

(72) Inventors: Marc R. Matsen, Seattle, WA (US); Mark Alan Negley, Bellevue, WA (US); Robert James Miller, Fall City, WA (US)

(73) Assignee: The Boeing Company, Chicago, IL (US)

( * ) Notice: Subject to any disclaimer, the term of this patent is extended or adjusted under 35 U.S.C. 154(b) by 675 days.

(21) Appl. No.: 13/758,609

(22) Filed: Feb. 4, 2013

(65) Prior Publication Data
US 2014/0219854 A1 Aug. 7, 2014

(51) Int. Cl.
*B22F 3/16* (2006.01)
*H05B 6/02* (2006.01)
*B22F 3/03* (2006.01)
(Continued)

(52) U.S. Cl.
CPC . *B22F 3/16* (2013.01); *B22F 3/03* (2013.01); *B22F 3/087* (2013.01); *B22F 3/105* (2013.01); *B22F 3/14* (2013.01); *H05B 6/06* (2013.01); *H05B 6/105* (2013.01); *B22F 2003/1053* (2013.01); *B22F 2202/05* (2013.01);
(Continued)

(58) Field of Classification Search
CPC ..................................................... B22F 3/087
USPC ......................................................... 419/52
See application file for complete search history.

(56) References Cited

U.S. PATENT DOCUMENTS 5,683,607 A * 11/1997 Gillespie ............. B21D 26/021
219/618
5,728,309 A 3/1998 Matsen et al.
(Continued)

FOREIGN PATENT DOCUMENTS

CN 101368243 A 2/2009

OTHER PUBLICATIONS

M. A. Imam and C. M Gilmore. "Fatigue and microstructural properties of quenched Ti-6Al-4V." Metallurgical Transactions A, vol. 14A, Feb. 1983, pp. 233-240.*
(Continued)

*Primary Examiner* — Keith Walker
*Assistant Examiner* — Stephani Hill
(74) *Attorney, Agent, or Firm* — Ostrager Chong Flaherty & Broitman P.C.

(57) ABSTRACT

A method for consolidating a pre-form made of powder, comprising: (a) placing the pre-form between smart susceptors; (b) heating the smart susceptors to a leveling temperature by applying a varying low-strength magnetic field having a magnetic flux that passes through surfaces of the smart susceptors; (c) applying consolidation pressure to the pre-form at least during a time period subsequent to the temperature of the smart susceptors reaching the leveling temperature; and (d) while consolidation pressure is being applied, applying a pulsed high-strength magnetic field having a magnetic flux that passes through a surface of the pre-form. The strength and pulse rate of the high-strength magnetic field are selected so that the crystallographic phase of the pre-form will rapidly oscillate at a substantially constant temperature. The pulsed high-strength magnetic field is applied sufficiently long that superplasticity of the pre-form is attained during phase oscillation.

14 Claims, 6 Drawing Sheets

(51) Int. Cl.
  *B22F 3/087*  (2006.01)
  *B22F 3/105*  (2006.01)
  *B22F 3/14*   (2006.01)
  *H05B 6/06*   (2006.01)
  *H05B 6/10*   (2006.01)

(52) U.S. Cl.
  CPC ........ *B22F2202/07* (2013.01); *B22F 2203/00* (2013.01); *H05B 2206/023* (2013.01)

(56) References Cited

U.S. PATENT DOCUMENTS

| | | | | |
|---|---|---|---|---|
| 6,091,063 | A * | 7/2000 | Woods | B23K 20/023 |
| | | | | 219/633 |
| 6,528,771 | B1 * | 3/2003 | Matsen | H05B 6/06 |
| | | | | 219/634 |
| 6,566,635 | B1 | 5/2003 | Matsen et al. | |
| 6,576,877 | B2 | 6/2003 | Dabelstein et al. | |
| 6,773,513 | B2 | 8/2004 | Ludtka | |
| 7,161,124 | B2 | 1/2007 | Kisner et al. | |
| 7,745,765 | B2 | 6/2010 | Kisner et al. | |
| 7,897,516 | B1 * | 3/2011 | Kinder | H01J 37/321 |
| | | | | 216/37 |
| 7,905,128 | B2 | 3/2011 | Matsen et al. | |
| 8,343,402 | B1 * | 1/2013 | Matsen | B29C 35/0805 |
| | | | | 264/109 |
| 2004/0256383 | A1 * | 12/2004 | Fischer | A61K 47/48215 |
| | | | | 219/634 |
| 2006/0231549 | A1 | 10/2006 | Kisner et al. | |
| 2010/0018271 | A1 | 1/2010 | Matsen et al. | |

OTHER PUBLICATIONS

Ye et al., "Blended elemental powder densification of Ti-6Al-4V by hot pressing," J. Materials Research, vol. 26, Issue 8 (2011), pp. 965-969.

Ludtka et al., "Exploring Ultrahigh Magnetic Field Processing of Materials for Developing Customized Microstructures and Enhanced Performance," Final Technical Report ORNL/TM-2005/79, Oak Ridge National Laboratory, Mar. 2005.

International Search Report and Written Opinion dated Apr. 16, 2014, International Application No. PCT/US2013/076912 (foreign counterpart to the instant application).

Chinese Office Action dated Jul. 6, 2016, Chinese Patent Application No. 201380072196.9 (Chinese counterpart to the instant application).

Patent Record Quick View, CN101368243A, published Feb. 18, 2009, Derwent World Patents Index.

English Translation of Chinese Office Action dated Jul. 6, 2016, Chinese Patent Application No. 201380072196.9 (Chinese counterpart to the instant application).

* cited by examiner

METHOD OF CONSOLIDATING/MOLDING NEAR NET-SHAPED COMPONENTS MADE FROM POWDERS

BACKGROUND

This disclosure generally relates to high-strength magnetic field processing of materials for developing customized microstructures and enhanced performance.

In powder metallurgy, powder materials are typically consolidated at high temperatures with long exposure times under applied hydrostatic loads to produce a product without porosity and with enhanced performance. For example, it is known to compact cold powder to create a semi-solid pre-form and then consolidate/mold that pre-form by applying heat and pressure. Pre-forms made from compacted powder can be placed directly upon a tool or die having a forming surface contoured to the desired shape of the completed part. In hot press forming, the pre-form is placed between matched metal tools that include forming surfaces that define the internal, external, or both mold lines of the completed part. The tools and pre-form are placed within a press and then the tools and pre-form are heated under pressure to produce a consolidated, net-shaped part.

It is known to consolidate and form pre-forms using inductively heated consolidation tools. Induction heating is a process in which an electrically conducting object (usually a metal) is heated by electromagnetic induction. During such heating, eddy currents are generated within the metal and the electrical resistance of the metal leads to Joule heating. An induction heater typically comprises an induction coil through which a high-frequency alternating current is passed. It is known to place a susceptor in or adjacent to the pre-form to achieve the necessary heating for consolidation or forming. The susceptor is heated inductively and transfers its heat principally through conduction to the pre-form sandwiched between opposing susceptor facesheets. During heating under pressure, the number of voids and/or the porosity of a pre-form can be reduced, i.e., the density can be increased.

Alloying, processing and heat treating of materials has in the past been generally limited to achieving equilibrium microstructures as defined by a temperature-composition phase diagram or metastable microstructures that result from rapid cooling processes. Recent research on ferrous alloys has shown experimentally that phase stability can be altered by applying a high-strength magnetic field to an extent that enables the microstructure of a pre-form to be tailored and precisely controlled. Combining a strong magnetic field with thermal processing can lead to the development of alloys and microstructures with superior properties In particular, there is a need for processes that will enable rapid fabrication of near net-shaped components from powder. This includes components made of ferrous (i.e., ferrous-based) alloys having new improved chemistries along with improved affordability methods for part manufacture of titanium-based alloys

SUMMARY

This disclosure is directed to methods and apparatus for rapid (i.e., in a few minutes or less) fabrication of near net-shaped components from powder made of metal alloys having new improved chemistries, resulting in enhanced performance (e.g., high strength). The disclosed methods should be applicable to a wide range of metallic alloys including ferrous-based and titanium-based alloys. These elements (Fe and Ti) and their alloys provide the combination of an available crystallographic phase change at elevated temperatures along with the opportunity to manipulate the phase diagram via high-intensity magnetic fields. Other elements such as thorium, hafnium, manganese, and vanadium-based alloys could work as well.

One aspect of the subject matter disclosed in detail below is a method for consolidating a pre-form made of powder, comprising: (a) placing the pre-form between smart susceptors; (b) heating the smart susceptors to a leveling temperature by applying a varying low-strength magnetic field having a magnetic flux that passes through surfaces of the smart susceptors; (c) applying consolidation pressure to the pre-form at least during a time period subsequent to the temperature of the smart susceptors reaching the leveling temperature; and (d) while consolidation pressure is being applied, applying a pulsed high-strength magnetic field having a magnetic flux that passes through a surface of the pre-form. The strength of the high-strength magnetic field is greater than a peak strength of the low-strength magnetic field. The strength and pulse rate of the high-strength magnetic field are selected so that the crystallographic phase of the pre-form will rapidly oscillate at a substantially constant temperature. The pulsed high-strength magnetic field is applied sufficiently long that superplasticity of the pre-form is attained during phase oscillation.

In accordance with one embodiment of the foregoing method: the strength of the high-strength magnetic field is greater than or equal to 0.5 tesla; the strength of the low-strength magnetic field is less than 0.1 tesla; the pulse rate of the high-strength magnetic field is multiple pulses per second; the consolidation pressure is in a range of 5 to 20 MPa; and the low-strength magnetic field alternates at a frequency that is in a range of 0.5 to 10 kHz. The foregoing method has particular application in the consolidation of powder that comprises ferrous-based or titanium-based metal alloy.

Another aspect is a method for fabricating a component from powder, comprising: (a) cold compacting powder to create a pre-form; (b) placing the pre-form between smart susceptors of an induction tool assembly; (c) flooding a space inside the induction tool assembly with an oxygen-free gas; (d) heating the smart susceptors to a leveling temperature by applying a varying low-strength magnetic field having a magnetic flux that passes through surfaces of the smart susceptors; (e) applying consolidation pressure to the pre-form at least during a time period subsequent to the temperature of the smart susceptors reaching the leveling temperature; and (f) while consolidation pressure is being applied, applying a pulsed high-strength magnetic field having a magnetic flux that passes through a surface of the pre-form. After step (f), the method may further comprise: (g) quenching the pre-form; (h) tempering the quenched pre-form; and (i) removing the pre-form from the induction tool assembly. The strength of the high-strength magnetic field is greater than a peak strength of the low-strength magnetic field. The strength and pulse rate of the high-strength magnetic field are selected so that the crystallographic phase of the pre-form will rapidly oscillate at a substantially constant temperature. The pulsed high-strength magnetic field is applied sufficiently long that superplasticity of the pre-form is attained during phase oscillation In accordance with a further aspect, a method for consolidating a pre-form made of metal alloy powder material is provided. The method comprises: (a) placing the pre-form between smart susceptors; (b) heating the smart susceptors to a leveling temperature by applying a varying low-strength magnetic field having a magnetic flux that passes through surfaces of the smart susceptors; (c) applying consolidation pressure to the pre-form at least during a time period subsequent to the temperature of the smart susceptors reaching the leveling temperature; and (d) while consolidation pressure is being applied, applying a pulsed high-strength magnetic field having a magnetic flux that passes through a surface of the pre-form. A strength of the high-strength magnetic field is greater than 0.5 tesla, while a peak strength of the low-strength magnetic field is less than 0.1 tesla. The strength and pulse rate of the high-strength magnetic field are selected so that the crystallographic phase of the pre-form will rapidly oscillate at a substantially constant temperature. The pulsed high-strength magnetic field is applied sufficiently long that superplasticity of the pre-form is attained during phase oscillation.

Yet another aspect is an apparatus for consolidating a pre-form made of powder, comprising: first and second tool assemblies respectively comprising respective portions of at least one induction coil and first and second smart susceptors having mutually confronting surfaces, the first tool assembly being movable relative to the second tool assembly for applying compressive force pressure on a pre-form disposed between the confronting surfaces; an electrical power supply electrically connected to the at least one induction coil; means for applying force to one or both of the first and second tool assemblies so that the confronting surfaces will exert compressive force on a pre-form placed therebetween; and a controller programmed to control the electrical power supply and the means for applying force as follows: (a) controlling the electrical power supply to apply a varying low-strength magnetic field having a magnetic flux that passes through surfaces of the smart susceptors until the smart susceptors are heated to a leveling temperature; (b) controlling the means for applying force to apply compressive force to the pre-form equal to a consolidation pressure at least during a time period subsequent to the time when the temperature of the smart susceptors reaches the leveling temperature; and (c) while consolidation pressure is being applied, controlling the electrical power supply to apply a pulsed high-strength magnetic field having a magnetic flux that passes through a surface of the pre-form. The strength of the high-strength magnetic field is greater than a peak strength of the low-strength magnetic field. The strength and pulse rate of the high-strength magnetic field are selected so that the crystallographic phase of the pre-form will rapidly oscillate at a substantially constant temperature. The pulsed high-strength magnetic field is applied sufficiently long that superplasticity of the pre-form is attained during phase oscillation.

Other aspects are disclosed and claimed below.

BRIEF DESCRIPTION OF THE DRAWINGS

Various embodiments will be hereinafter described with reference to drawings for the purpose of illustrating the foregoing and other aspects.

Reference will hereinafter be made to the drawings in which similar elements in different drawings bear the same reference numerals.

DETAILED DESCRIPTION

The following detailed disclosure describes a method and an apparatus for consolidating and molding/forming a pre-form made from ferrous-based or titanium-based metal alloy in powder form. However, the combination of inductive heating using smart susceptors followed by high-strength magnetic field processing (while consolidation pressure is applied) has application to other materials that undergo microstructural change in response to application of an oscillating high-strength magnetic field. At the magnetic field intensities disclosed herein, most materials will be magnetically saturated and the processing temperatures will drive many materials past their Curie temperature and into a non-magnetic state, but will still be affected by the high-strength magnetic field.

The methodology disclosed below is suitable for fabricating bolts, pins, landing gear components, flap tracks, hydraulic cylinders and other components. The disclosed consolidation/molding process has particular application in the processing of ferrous-based and titanium-based alloys, but more generally can be applied to any material whose microstructure undergoes a crystallographic phase change at elevated temperatures, which phase change can be manipulated by application of a high-strength magnetic field.

The specific method disclosed herein combines induction heating of a metal alloy powder pre-form followed by the imposition of a high-strength magnetic field while a consolidation pressure is applied. In cases where the powder is a ferrous-based alloy (hereinafter "ferrous alloy powder"), the system disclosed herein rapidly heats the pre-form to its ferrite-to-austenite phase change via inductive heating using smart susceptors. Then a consolidation pressure is applied to the pre-form. Thereafter, an intermittent high-strength magnetic field is applied by the induction coils to rapidly oscillate the crystallographic phase of the ferrous alloy powder pre-form to facilitate consolidation at a substantially constant temperature while consolidation pressure is being applied. Superplasticity is imparted via the phase oscillation. As a result, consolidation is rapid and complete even when a low consolidation pressure is applied.

The use of a high-strength magnetic field is especially advantageous in the consolidation of pre-forms that have a thickness in excess of the thickness limit (e.g., about 4 inches) which attends consolidation using thermal oscillation techniques.

Figure 1:
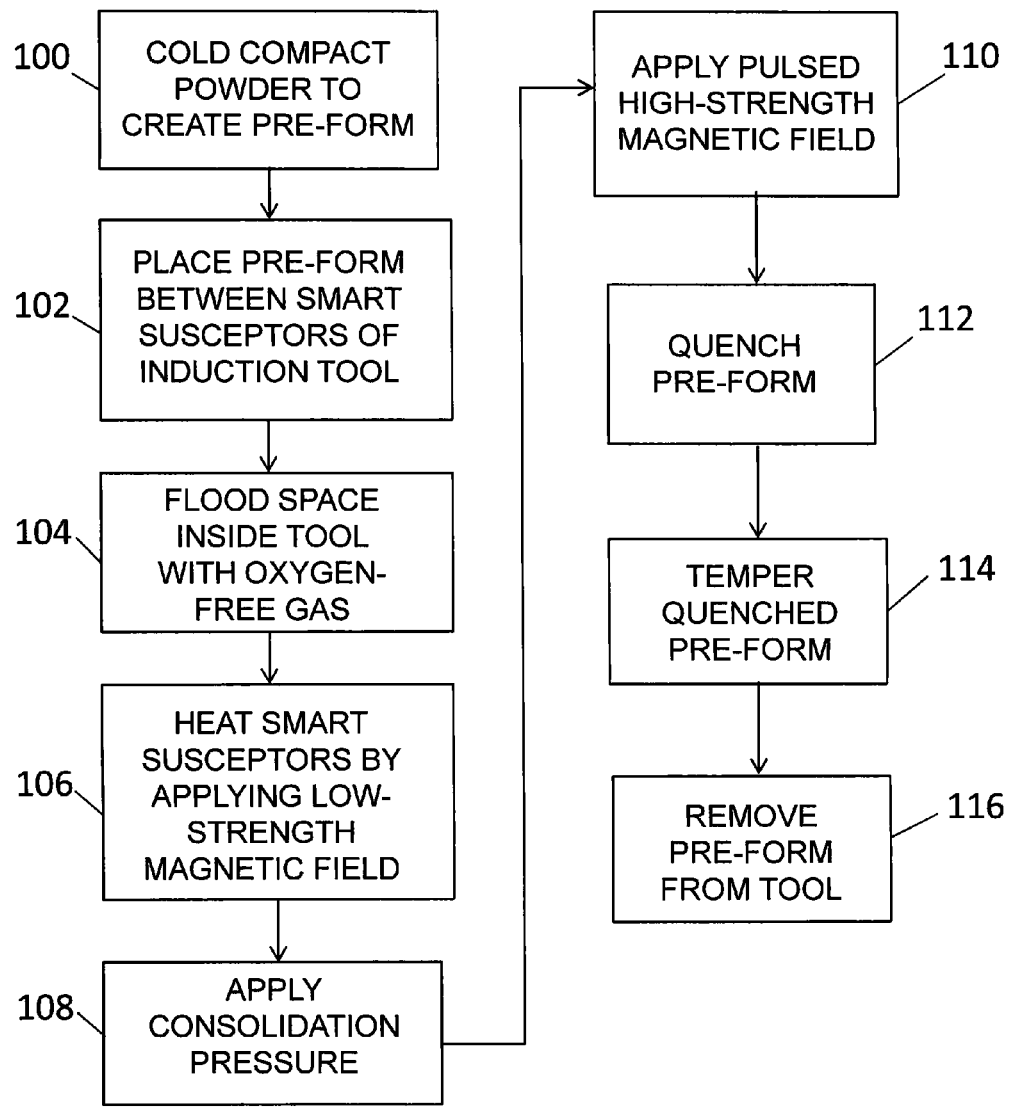
FIG. 1 is a flowchart showing an induction process for consolidating metal alloys made from ferrous alloy powder in accordance with one embodiment.

FIG. 1 is a flowchart showing an induction process for consolidating metal alloys made from ferrous alloy powder in accordance with one embodiment. In step 100, ferrous alloy powder is cold compacted to create a semi-solid pre-form. In step 102, the pre-form is loaded in a laminated induction tool having a pair of mutually opposing smart susceptor tool faces. The pre-form is placed between the smart susceptors. The appropriate susceptor chemistry is selected to provide the desired initial leveling temperature at the surface of the tool during heating of the pre-form. The smart susceptors create the sheet metal shell that forms the face of the laminated induction tool.

In step 104, the space inside the tool that surrounds the pre-form is flooded with an oxygen-free gas (e.g., hydrogen or nitrogen) to eliminate oxide formation during heating. In step 106, the smart susceptors are rapidly heated to a leveling temperature dictated by the smart susceptor chemistry by applying a varying (e.g., an alternating) low-strength magnetic field having a magnetic flux that passes through surfaces of the smart susceptors. This low-strength magnetic field can be produced by supplying AC power to induction coils which are incorporated inside a pair of mutually opposing tooling dies (to be described in detail below with reference to FIGS. 5 and 6). The peak (i.e., maximum) strength of the low-strength magnetic field can be less than 0.1 tesla. Typical RMS values for the magnetic field strength during the induction heating portion of the process are in the range of 0.02 to 0.04 tesla, resulting in a peak field in the range of 0.03 and 0.06 tesla. Typical frequencies of oscillation would be in the range of 0.5 to 10 kHz (e.g., 1 kHz) for the induction heating portion of the process.

Referring again to FIG. 1, in step 108, consolidation pressure is applied to the pre-form by actuators, which force the opposing tooling dies toward each other while the smart susceptors and the pre-form are sandwiched therebetween. The consolidation pressure is applied at least during a time period subsequent to the temperature of the smart susceptors reaching their leveling temperature. In step 110, an intermittent (i.e., pulsed) high-strength magnetic field (having a magnetic flux that passes through a surface of the pre-form) is applied to rapidly oscillate the crystallographic phase of the powder pre-form at a substantially constant temperature while the consolidation pressure is being applied. In accordance with one embodiment, the consolidation pressure is in a range of 5 to 20 MPa; the strength of the high-strength magnetic field is greater than or equal to 0.5 tesla; and the pulse rate of the high-strength magnetic field is multiple pulses per second. The strength, pulse rate and number of high-strength magnetic field pulses applied are chosen such that the high-strength magnetic field changes the phase equilibrium diagram associated with the particular metallic alloy used to make the pre-form and produces rapid phase transformations that stimulate superplastic behavior for rapid and complete metallic alloy powder consolidation. Consolidation is rapid and complete even while using a low consolidation pressure.

Following the application of the high-strength magnetic field, the pre-form can be quenched by supplying a cooling fluid to the back sides of the smart susceptors (step 112 in FIG. 1). After quenching, the heat treatment is completed by tempering the pre-form (step 114). Quenching and tempering are especially advantageous for ferrous-based components The heat-treated pre-form is then removed from the tool (step 116). The result is a powdered part having high strength properties.

Figure 2B:
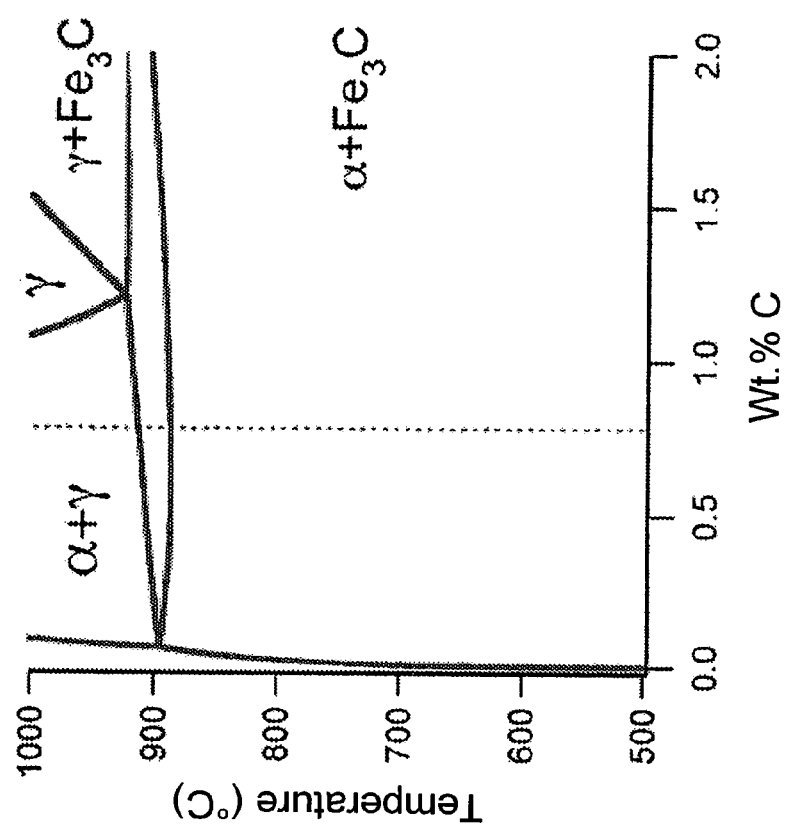
FIGS. 2A and 2B are predictions of a pseudobinary phase diagram for tested bainitic steel for both conventional equilibrium (FIG. 2A) and magnetically enhanced (using a 30-tesla magnetic field) equilibrium conditions. [These calculated phase diagrams were taken from the March 2005 Final Technical Report (ORNL/TM-2005/79) from Oak Ridge National Laboratory, entitled "Exploring Ultrahigh Magnetic Field Processing of Materials for Developing Customized Microstructures and Enhanced Performance" (Principal Investigator: Dr. Gerard M. Ludtka).]
Figure 2A:
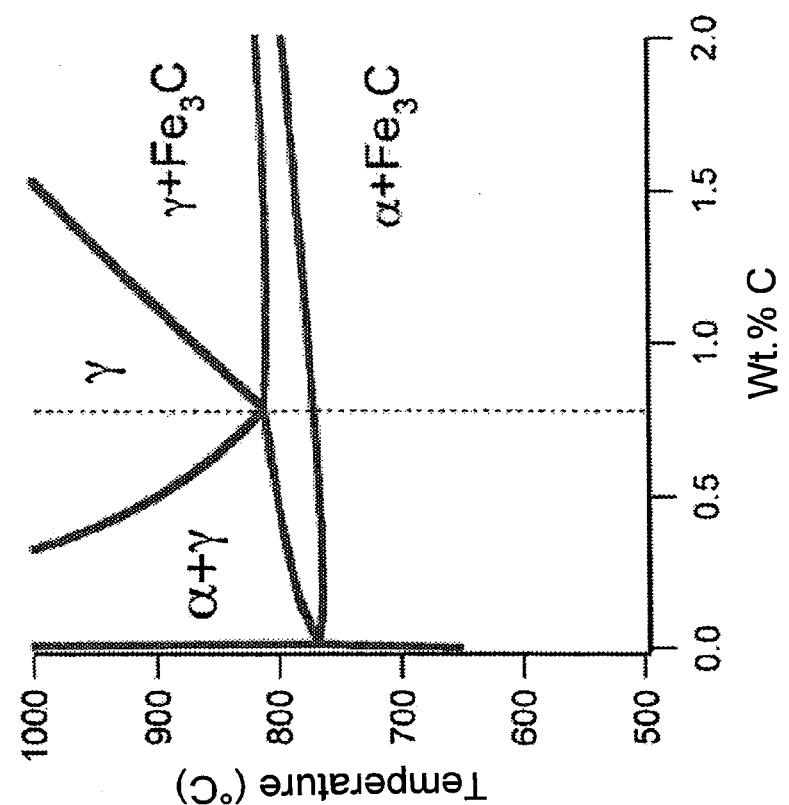

It is known that high-strength magnetic fields can dramatically affect the phase diagrams of carbon steel alloys. The March 2005 Final Technical Report ORNL/TM-2005/79 from Oak Ridge National Laboratory included predicted phase diagrams showing that high-strength (e.g., 30 tesla) magnetic fields raise phase transformation temperatures, increase the solubility of carbon in the various phases, and shift critical congruent points such as eutectoid chemistries and temperatures. FIGS. 2A and 2B (taken from the foregoing report) show calculated pseudobinary phase diagrams for tested bainitic steel for both conventional equilibrium (FIG. 2A) and magnetically enhanced equilibrium conditions (FIG. 2B). The strength of the applied magnetic field was 30 tesla. The calculation results depicted in FIGS. 2A and 2B demonstrate that the phase fields are shifted upward and to the right by the applied magnetic field, which means that the phase transformation temperatures are raised and that phase solubility for carbon is enhanced.

The process disclosed herein employs the foregoing effect to rapidly change the crystallographic phase of powdered components during their consolidation at a substantially constant temperature. In accordance with one embodiment, a high-strength magnetic field is oscillated (i.e., pulsed) rapidly at a rate of multiple times per second while consolidation pressure is applied. In accordance with one embodiment, the magnetic field is oscillated between zero and a strength equal to at least 0.5 tesla, i.e., each magnetic pulse has an intensity of at least 0.5 tesla. The result is rapid change of the phase of the powdered component during consolidation. This change in phase imparts the superplasticity that enables rapid void-free consolidation. The utilization of metal alloy powder eliminates the constraints on alloying agents resulting from wrought processing requirements and enables higher alloying content. FIG. 2B shows the effect of a 30-tesla magnetic field, but smaller fields (even 0.5 tesla) would enable meaningful capabilities. This process enables the fabrication of near net-shaped components having improved properties from pre-forms having chemistries which are not possible using other fabrication methods.

Figure 3:
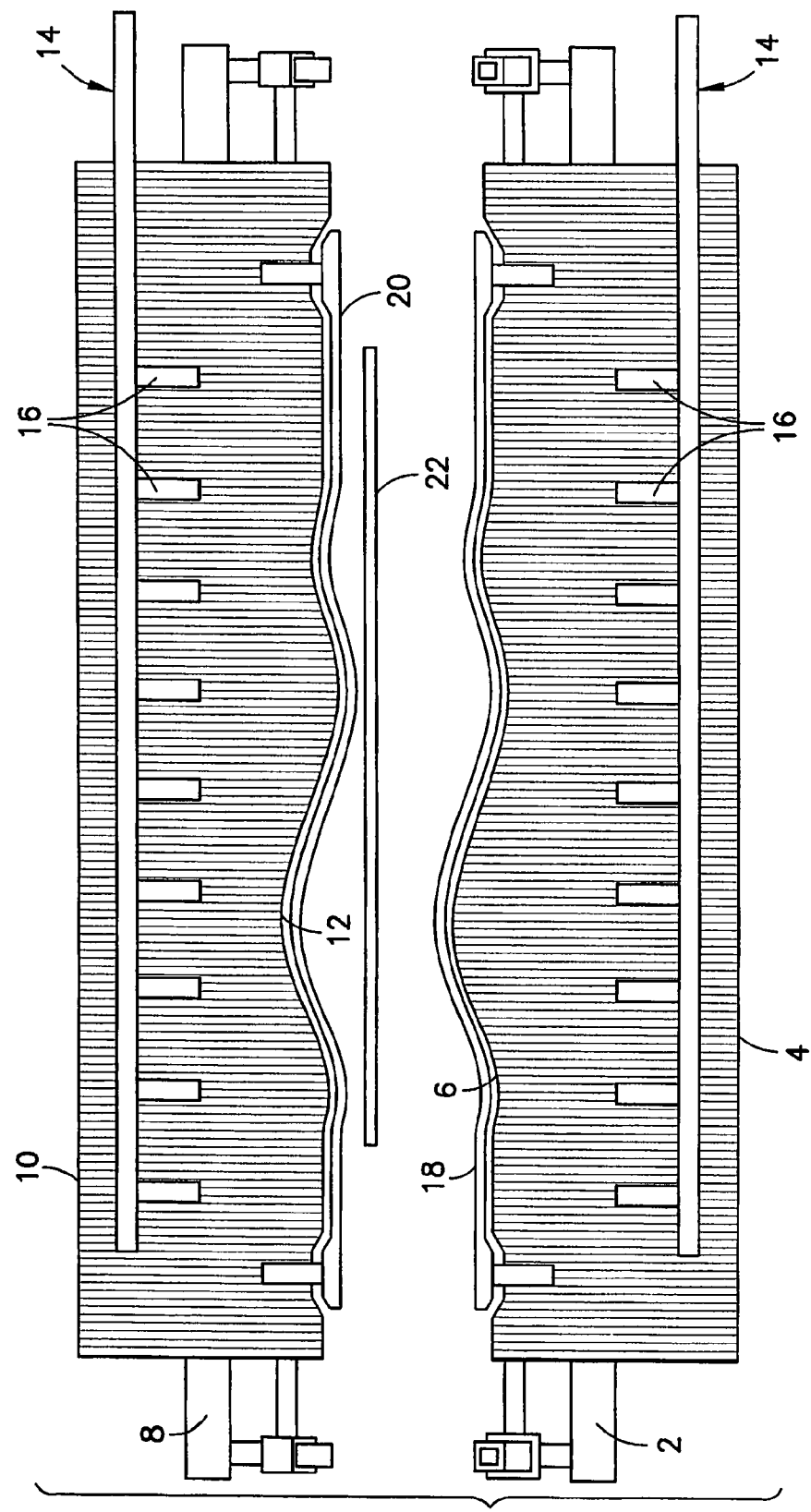
FIG. 3 is a diagram showing a sectional view of portions of a known apparatus, the apparatus comprising upper and lower tool assemblies with matched surfaces designed to consolidate and form a pre-form. The tool assemblies are shown in their retracted positions and the pre-form is shown in an uncompressed state.
Figure 4:
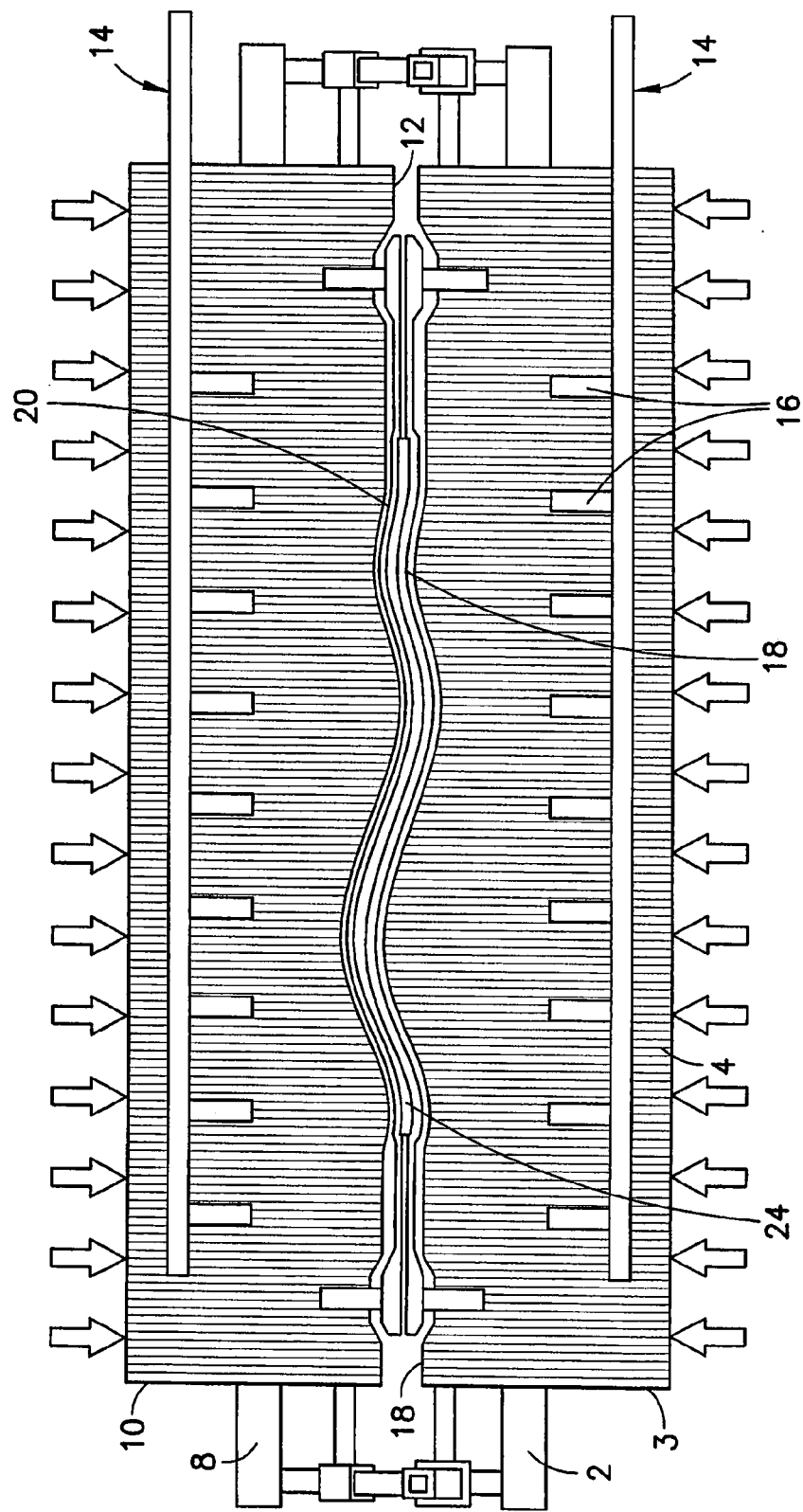
FIG. 4 is a diagram showing a sectional view of the apparatus depicted in FIG. 3, except that the tool assemblies are in their extended positions with the pre-form compressed therebetween.

One known apparatus for matched tool consolidation of pre-forms using the process disclosed herein is partly depicted in FIGS. 3 and 4. FIG. 3 shows the apparatus in a pre-consolidation stage, while FIG. 4 shows the apparatus while consolidation is under way. The apparatus comprises a lower die frame 2, a lower tooling die 4 supported by the lower die frame 2 and having a first contoured die surface 6, an upper die frame 8, and an upper tooling die 10 supported by the upper die frame 8 and having a second contoured die surface 12 which is complementary to the first contoured die surface 6. The contoured die surfaces 6 and 12 may define a complex shape different than what is depicted in FIGS. 3 and 4. However, the novel means disclosed herein also have application when the die surfaces are planar. The die frames 2 and 8 act as mechanical constraints to keep the lower and upper tooling dies 4 and 10 together and to maintain the dimensional accuracy of the dies. The die frames 2 and 8 may be coupled to actuators (not shown in FIGS. 3 and 4), which move the dies toward and away from each other. In addition, one or more induction coils (not shown in FIGS. 3 and 4) may extend through each of the tooling dies 4 and 10 to form an induction heater for raising the temperature of the pre-form to at least its consolidation temperature. A thermal control system (not shown) may be connected to the induction coils.

Still referring to FIGS. 3 and 4, the apparatus further comprises a lower susceptor 18 and an upper susceptor 20 made of electrically and thermally conductive material. The susceptors and the induction coils are positioned so that the susceptors can be heated by electromagnetic induction. The lower susceptor 18 may generally conform to the first contoured die surface 6 and the upper susceptor 20 may generally conform to the second contoured die surface 12. In some cases, it is preferred that the temperature at which a pre-form is consolidated should not exceed a certain temperature. To this end, susceptors 18 and 20 are preferably so-called "smart susceptors". A smart susceptor is constructed of a material, or materials, that generate heat efficiently until reaching a threshold (i.e., Curie) temperature. As portions of the smart susceptor reach the Curie temperature, the magnetic permeability of those portions falls to unity (i.e., the susceptor becomes paramagnetic) at the Curie temperature. This drop in magnetic permeability has two effects: it limits the generation of heat by those portions at the Curie temperature, and it shifts the magnetic flux to the lower temperature portions, causing those portions below the Curie temperature to more quickly heat up to the Curie temperature. Accordingly, thermal uniformity of the heated pre-form during the forming process can be achieved irrespective of the input power fed to the induction coils by judiciously selecting the material for the susceptor. In accordance with one embodiment, each susceptor is a layer or sheet of magnetically permeable material. Preferred magnetically permeable materials for constructing the susceptors include ferromagnetic materials that have an approximately 10-fold decrease in magnetic permeability when heated to a temperature higher than the Curie temperature. Such a large drop in permeability at the critical temperature promotes temperature control of the susceptor and, as a result, temperature control of the part being manufactured. Ferromagnetic materials include iron, cobalt, nickel, gadolinium and dysprosium, and alloys thereof.

In accordance with one embodiment, the susceptors are formed of ferromagnetic materials including a combination of iron, nickel, chromium and/or cobalt, with the particular material composition chosen to produce a set temperature point to which the susceptor is heated in response to the electromagnetic energy generated by the induction heating coil. In this regard, the susceptor may be constructed such that the Curie point of the susceptor at which there is a transition between the ferromagnetic and paramagnetic phases of the material defines the set temperature point to which the susceptor is inductively heated. Moreover, the susceptor may be constructed such that the Curie point is greater, albeit typically only slightly greater, than the phase transformation temperature of the pre-form.

The consolidation/molding apparatus shown in FIGS. 3 and 4 further comprises a cooling system 14 comprising respective sets of cooling conduits 16 (made, e.g., from SiN tubing) distributed in the tooling dies 4 and 10. Each set of coolant conduits 16 is coupled via respective manifolds to a source of cooling medium, which may be liquid, gas or a gas/liquid mixture such as mist or aerosol. The cooling system can be activated in order to quench the back sides of the smart susceptors after high-strength magnetic field processing of the pre-form.

In a typical implementation of a consolidation and molding process, the pre-form 22 is initially positioned between the upper and lower tooling dies of the stacked tooling apparatus, as shown in FIG. 3. Then the tooling dies 4 and 10 are moved toward each other by hydraulic, pneumatic or other actuators, until they reach their respective tool-closed positions, shown in FIG. 4. During the consolidation process, oscillating electrical power is supplied to the induction coils by a power supply (not shown). The supplied electrical power produces an oscillating magnetic flux which rapidly heats the susceptors 18 and 20 to their leveling temperature, which in turn heat the pre-form 22. During this process, the pre-form will be molded by the opposing contoured (or planar) surfaces of the susceptors 18 and 20.

In accordance with the consolidation process disclosed herein, the induction coils are initially supplied with an alternating current to produce a varying low-strength magnetic field (e.g., less than 0.1 tesla) that heats the smart susceptors to their leveling temperature. Following application of the low-strength magnetic field, consolidation pressure is applied. While the consolidation pressure is being applied, the inductions coils are then supplied with an intermittent direct current to produce a pulsed high-strength magnetic field (e.g., at least 0.5 tesla) that causes the phase of the pre-form to oscillate rapidly, thereby imparting superplasticity to the pre-form material due to volumetric mismatch between the phases.

After application of the high-strength magnetic field for a sufficiently long period of time, the cooling system 14 will be operated to apply a cooling medium to the tooling dies 4 and 10, thereby also cooling the susceptors 18 and 20 and the pre-form 22 therebetween. The pre-form 22 remains sandwiched between the susceptors for a predetermined period of time until quenching of the pre-form has been achieved. This allows the molded and consolidated pre-form 22 to retain the structural shape which is defined by the contoured surfaces of the susceptors 18 and 20 and a microstructure that provides enhanced strength properties. After consolidation and cooling, the actuators move the tool dies apart to allow removal of the consolidated product from the mold. The formed and cooled pre-form is removed from the stacked tooling apparatus without loss of dimensional accuracy when it is cooled at an appropriate property-enhancing rate.

Figure 5:
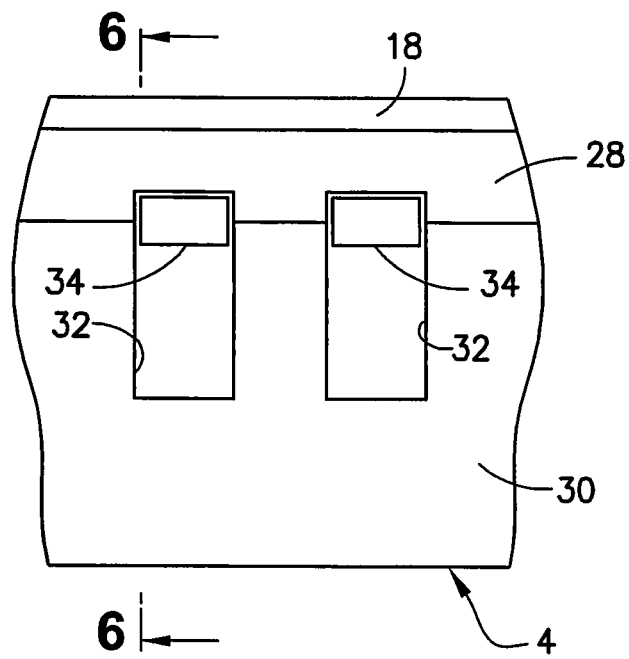
FIG. 5 is a diagram showing an end view of a portion of a lower tooling die in accordance with one embodiment.

FIG. 5 is an end view of a portion of a lower tooling die 4 in accordance with one embodiment. The upper tooling die may have a similar construction. Each tooling die comprises a multiplicity of cavities 32, which may be mutually parallel. FIG. 5 shows only two such cavities 32, the upper portion of each cavity 32 having a portion of a respective turn of an induction coil 34 which passes through the uppermost portion of the cavity.

Figure 6:
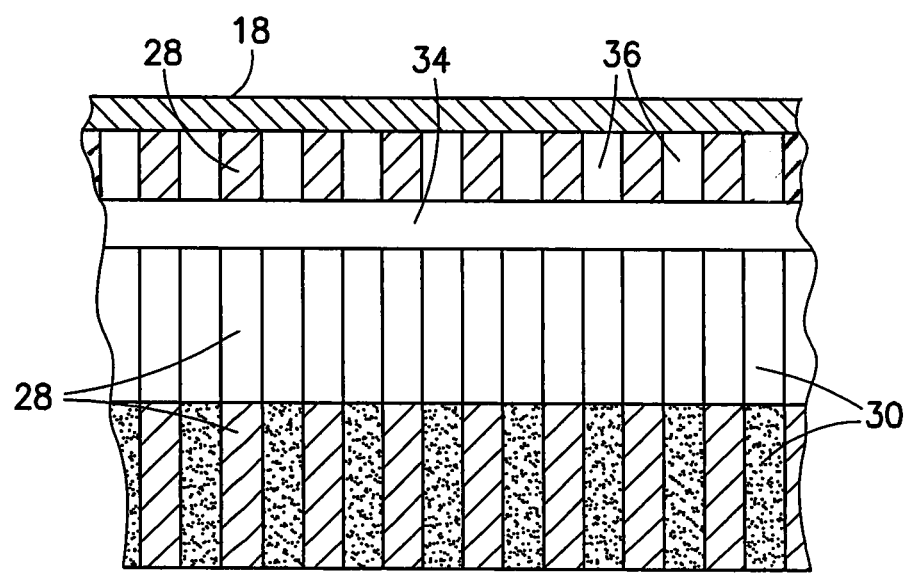
FIG. 6 is a diagram showing a sectional view of a portion of the lower tooling partially depicted in FIG. 5, the section being taken along line 6-6 seen in FIG. 5.

The sectional view shown in FIG. 6 is taken along line 6-6 seen in FIG. 5 and passes through a cavity 32, but not through the portion of inductive coil 34 therein. One or more coils can be used. As the parts requiring fabrication get bigger, it may be necessary to break the coil into multiple coils connected in parallel in order to limit the voltage required by each coil. Without the smart susceptors, control of the current (and resulting temperature) to each parallel coil could become problematic. For the sake of simplicity, FIGS. 5 and 6 show a portion of a lower tooling die for which the corresponding portion of the attached susceptor is horizontal rather than angled.

Still referring to FIGS. 5 and 6, the lower tooling die may comprise a lamination of alternating metal (e.g., an Inconel® austenitic nickel/chromium-based superalloy) plates 28 and dielectric spacers 30 which are trimmed to appropriate dimensions to form a plurality of parallel longitudinal cavities 32 in which the turns of one or more induction coils 34 reside. Each metal plate 28 may have a thickness in the range of about 0.0625 to about 0.5 inch. Air gaps 36 (see FIG. 6) may be provided between the upper portions of metal plates 28 to facilitate cooling of the susceptors. The stacked metal plates 28 may be attached to each other using clamps, fasteners and/or other suitable means (not shown) known to persons skilled in the art. The stacked metal plates 28 may be selected based on their electrical and thermal properties. The stacked metal plates 28 are typically formed of a strong and rigid material having a melting point well above the consolidation temperature of the pre-form. Additionally, the stacked metal plates 28 can be formed of a material characterized by a low thermal expansion, high thermal insulation, and a low electromagnetic absorption. The stacked metal sheets may be oriented in generally perpendicular relationship with respect to the respective contoured die surfaces. Each metal sheet may have a thickness of from about 1/16" to about 1/4", for example. An electrically insulating coating (not shown) may optionally be provided on each side of each stacked sheet to prevent flow of electrical current between the stacked metal sheets. The insulating coating may, for example, be a ceramic material. An air gap may be provided between adjacent stacked metal sheets to facilitate cooling of the dies, such as a gap of about 0.15".

As best seen in FIG. 6, the smart susceptor 18 is attached directly to the metal plates 28 of the lower tooling die. (The smart susceptor 20 seen in FIG. 3 is likewise attached directly to the metal plates of the upper tooling die.) In accordance with one implementation, the metal plates 28 are made of austenitic (non-magnetic) stainless steel. The stacked metal plates 28 can have a space 36 between them to allow the quenching fluid (gas or liquid) to have direct impingement against the surface of the heated susceptor 18. This spacing is dictated by the thickness and strength of the smart susceptor surface shell and the consolidation pressures used. In addition, the susceptors do not require an electrical connection to one another. The metal plates 28 are interleaved with dielectric spacers 30 except near the susceptor and in places that are needed to allow the quenching medium to flow to the susceptor. The same considerations apply to the upper tooling die and the susceptor attached thereto.

Preferably each induction coil 34 is fabricated from copper tubing which is lightly drawn. A lightly drawn condition of the tubing enables precision bending by numerically controlled bending machines. Numerically controlled bending of the tubes allows accurate placement of the tubing relative to the changing contours of the susceptors, thereby improving the degree to which each susceptor is uniformly inductively coupled to the induction heater across the length and width of the susceptor. However, it should be understood that the compliant layer disclosed hereinafter can be employed also in cases wherein the susceptors are planar rather than concave/convex. Optionally the coils 34 also remove thermal energy by serving as a conduit for a coolant fluid, such as water. After being bent and installed, the coils include straight tubing sections connected by flexible tubing sections. The flexible tubing sections connect the straight tubing sections and also allow the dies to be separated. The accurate placement of the tubing of the induction coils 34 promotes uniformity in the amount of heat generated by the magnetic flux field and the amount of heat removed by flow of the coolant fluid.

As disclosed in U.S. Pat. No. 6,528,771, the induction coils 34 can be connected to a temperature control system that includes a power supply, a controlling element, a sensor and a fluid coolant supply preferably containing water (not shown). The power supply supplies an alternating current to the induction coils 34 which causes the coils to generate the electromagnetic flux field. The fluid coolant supply supplies water to the induction coils 34 for circulation through the coils and the removal of thermal energy from the dies. The sensor is capable of measuring the power supplied by the power supply. Alternatively, or in addition to measuring the power supply, the sensor may include a voltmeter that can measure the voltage drop across the induction coils 34. The controlling element receives the sensor output and uses the measurements in a feedback loop to adjust the power being supplied by the power supply. The controlling element can include hardware, software, firmware, or a combination thereof that is capable of using feedback to adjust the voltage output by the power supply.

Figure 7:
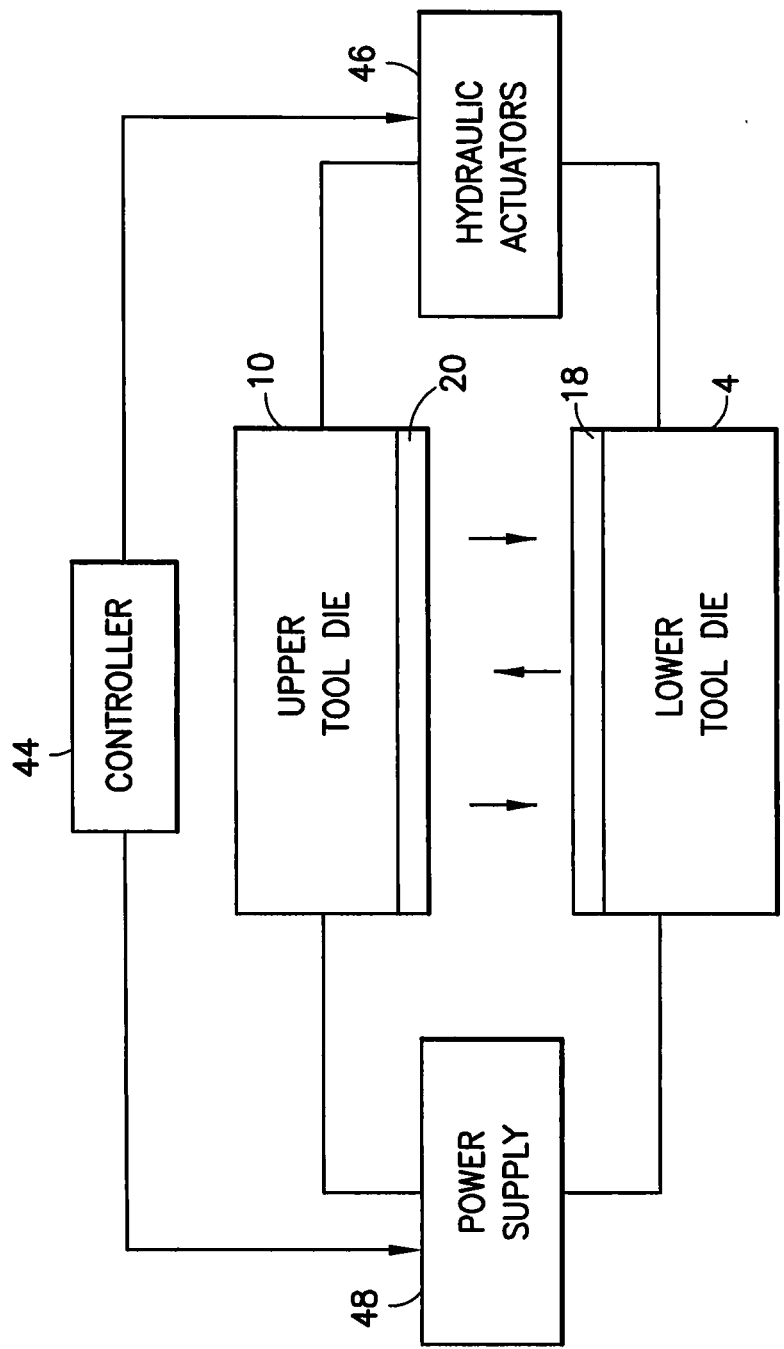
FIG. 7 is a block diagram showing components of a computerized system for performing the consolidation/molding process disclosed herein.

A computerized system for performing operations 106, 108, 110, 112, and 114 seen in FIG. 1 in accordance with a specified schedule is shown in FIG. 7. In this embodiment, an upper susceptor 20 is disposed below the upper tool die 10, while a lower susceptor 18 is disposed above the lower tool die 4. During the consolidation process, the upper and lower tool dies are moved toward each other by hydraulic actuators 46, which tool closing motion is indicated by arrows in FIG. 7. Electrical power is supplied to the induction coils (not shown) by an electrical power supply 48 in the manner previously described. After consolidation and cooling, the hydraulic actuators 46 move the tool dies apart to allow removal of the consolidated product from the mold. The hydraulic actuators 46 and the power supply 48 (and also the coolant supply, which is not shown in FIG. 9) operate under the control of a controller 44. The controller 44 may be a computer or processor comprising a processing unit (e.g., a central processing unit) and some form of memory (i.e., computer-readable medium) for storing a program which is readable by the processing unit.

The computer program may include settable process parameters for controlling the operation of the electrical power supply and hydraulic actuators. For example, the controller 44 may be programmed to control the electrical power supply 48 and the hydraulic actuators 46 as follows: (a) controlling the electrical power supply 48 to apply a varying low-strength magnetic field having a magnetic flux that passes through surfaces of the smart susceptors until the smart susceptors are heated to a leveling temperature; (b) controlling the hydraulic actuators 46 to apply compressive force to the pre-form equal to a consolidation pressure at least during a time period subsequent to the time when the temperature of the smart susceptors reaches the leveling temperature; and (c) while consolidation pressure is being applied, controlling the electrical power supply 48 to apply a pulsed high-strength magnetic field having a magnetic flux that passes through a surface of the pre-form (not shown in FIG. 7). The strength of the high-strength magnetic field is greater than a peak strength of the low-strength magnetic field. The strength and pulse rate of the high-strength magnetic field are selected so that the crystallographic phase of the pre-form will rapidly oscillate at a substantially constant temperature. The pulsed high-strength magnetic field is applied sufficiently long that superplasticity of the pre-form is attained during phase oscillation.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings herein without departing from the essential scope thereof. Therefore it is intended that the claims not be limited to the particular embodiments disclosed.

The method claims set forth hereinafter should not be construed to require that the steps recited therein be performed in alphabetical order or in the order in which they are recited, and should not be construed to exclude two or more steps being performed contemporaneously during at least a portion of the duration of one of said steps.

The invention claimed is:

1. A method for consolidating a pre-form made of powder, comprising:
   (a) placing the pre-form between smart susceptors;
   (b) heating the smart susceptors to their Curie temperature that is greater than a phase change temperature of the pre-form by supplying an alternating current to induction coils which produce a varying magnetic field having a peak strength less than 0.1 tesla and a magnetic flux that passes through surfaces of the smart susceptors;
   (c) applying consolidation pressure to the pre-form at least during a time period subsequent to the temperature of the smart susceptors reaching the Curie temperature; and
   (d) while consolidation pressure is being applied, intermittently supplying direct current to the induction coils to produce a pulsed magnetic field having a strength greater than or equal to 0.5 tesla and a magnetic flux that passes through a surface of the pre-form,
   wherein a pulse rate of the pulsed magnetic field is selected so that the crystallographic phase of the pre-form will oscillate, and the pulsed magnetic field is applied sufficiently long that superplasticity of the pre-form is attained during phase oscillation.

2. The method as recited in claim 1, wherein the pulse rate of the pulsed magnetic field is multiple pulses per second.

3. The method as recited in claim 1, wherein the consolidation pressure is in a range of 5 to 20 MPa.

4. The method as recited in claim 1, wherein the varying magnetic field alternates at a frequency that is in a range of 0.5 to 10 kHz.

5. The method as recited in claim 1, wherein the powder comprises a ferrous-based or titanium-based alloy.

6. A method for fabricating a component from powder, comprising:
   (a) cold compacting powder to create a pre-form;
   (b) placing the pre-form between smart susceptors of an induction tool assembly;
   (c) flooding a space inside the induction tool assembly with an oxygen-free gas;
   (d) heating the smart susceptors to their Curie temperature that is greater than a phase change temperature of the pre-form by supplying an alternating current to induction coils which produce a varying magnetic field having a peak strength less than 0.1 tesla and a magnetic flux that passes through surfaces of the smart susceptors;
   (e) applying consolidation pressure to the pre-form at least during a time period subsequent to the temperature of the smart susceptors reaching the Curie temperature; and
   (f) while consolidation pressure is being applied, intermittently supplying direct current to the induction coils to produce a pulsed magnetic field having a strength greater than or equal to 0.5 tesla and a magnetic flux that passes through a surface of the pre-form,
   wherein a pulse rate of the pulsed magnetic field is selected so that the crystallographic phase of the pre-form will oscillate, and the pulsed magnetic field is applied sufficiently long that superplasticity of the pre-form is attained during phase oscillation.

7. The method as recited in claim 6, wherein the pulse rate of the pulsed magnetic field is multiple pulses per second.

8. The method as recited in claim 6, wherein the consolidation pressure is in a range of 5 to 20 MPa.

9. The method as recited in claim 6, wherein the varying magnetic field alternates at a frequency that is in a range of 0.5 to 10 kHz.

10. The method as recited in claim 6, wherein the powder comprises a ferrous-based or titanium-based alloy.

11. The method as recited in claim 6, further comprising the following steps performed after step (f) and while the pre-form remains between the smart susceptors:
    (g) quenching the pre-form;
    (h) tempering the quenched pre-form; and
    (i) removing the pre-form from the induction tool assembly.

12. A method for consolidating a pre-form made of powder comprising ferromagnetic material, comprising:
    (a) placing the pre-form between smart susceptors;
    (b) heating the smart susceptors to their Curie temperature that is greater than a phase change temperature of the pre-form by supplying an alternating current to induction coils which produce a varying magnetic field having a peak strength less than 0.1 tesla and a magnetic flux that passes through surfaces of the smart susceptors;
    (c) applying consolidation pressure to the pre-form at least during a time period subsequent to the temperature of the smart susceptors reaching the Curie temperature; and
    (d) while consolidation pressure is being applied, intermittently supplying direct current to the induction coils to produce a pulsed magnetic field having a strength greater than or equal to 0.5 tesla and a magnetic flux that passes through a surface of the pre-form,
    wherein a pulse rate of the pulsed magnetic field is selected so that the crystallographic phase of the pre-form will oscillate, and the pulsed magnetic field is applied sufficiently long that superplasticity of the pre-form is attained during phase oscillation.

13. The method as recited in claim 12, wherein the pulse rate of the pulsed magnetic field is multiple pulses per second.

14. The method as recited in claim 12, wherein the consolidation pressure is in a range of 5 to 20 MPa.

* * * * *